United States Patent Office 3,525,487
Patented Aug. 25, 1970

3,525,487
SECONDARY AIR FLOW DUCT FOR AN AIRCRAFT TAIL SECTION
Gerhard Kopp, Munich, Germany, assignor to Entwicklungsring Sud G.m.b.H., Munich, Germany
Filed Oct. 9, 1968, Ser. No. 766,117
Claims priority, application Germany, Oct. 18, 1967, 1,531,402
Int. Cl. B64d 29/04, 33/04
U.S. Cl. 244—53         6 Claims

ABSTRACT OF THE DISCLOSURE

A secondary air flow duct arrangement for the tail section of a VTO/STO aircraft. A plurality of ducts are arranged about the aircraft engine. One end of each duct is positioned in alignment with a fresh air inlet opening defined by the engine cowling. The exhaust end of each of the air flow ducts terminates at a discharged orifice defined by a split thrust ring. The two halves of the thrust ring are maintained in alignment by means of pins which are retained within cooperating alignment holes.

BACKGROUND OF THE INVENTION

This invention relates to an apparatus in the form of a secondary air flow duct arrangement for the tail section of a vertical takeoff (VTO) and short takeoff (STO) aircraft. Various systems have been previously suggested which provide for the flow of secondary air into inlets defined by the tail section of the aircraft. The air passes through the interior of the airframe and is exhausted through the ejector nozzle. Such arrangements are particularly suitable for aircraft having rigid nondeflecting exhaust nozzles. With respect to such arrangements, the tail section is usually fashioned in the form of an integral tube which serves to absorb the various pressures acting upon the airframe.

Conventional vertical VTO/STO aircraft are generally provided with engines having deflectable nozzles so as to facilitate adaptation to different flight conditions. Various door arrangements are currently utilized with such deflecting nozzles. These door arrangements frequently interfere with the secondary air flow previously mentioned. The inclusion of the secondary air flow openings in the lower portion of the fuselage introduces various problems particularly with respect to strength and sealing of the fuselage. The object of the present invention is to eliminate this shortcoming by providing a plurality of air inlets evenly disposed about the entire periphery of the engine cowling. Connected to the inlets are air ducts which are in turn connected to a divided thrust ring terminating at the door of the secondary nozzle. Each half of the thrust ring is centered and retained in position by means of a combination of pins and mating alignment holes.

In connection with the alternate embodiment to be subsequently described, it is suggested that to facilitate installation and removal the ducts be fabricated by means of separate sections which display opposing centering surfaces. The ducts are secured to the engine cowling by screws or other suitable removable fasteners to facilitate assembly and replacement.

Other features and advantages of this invention will become apparent through reference to the following description and accompanying drawings.

DESCRIPTION OF THE PREFERRED EMBODIMENTS

Figure 1:
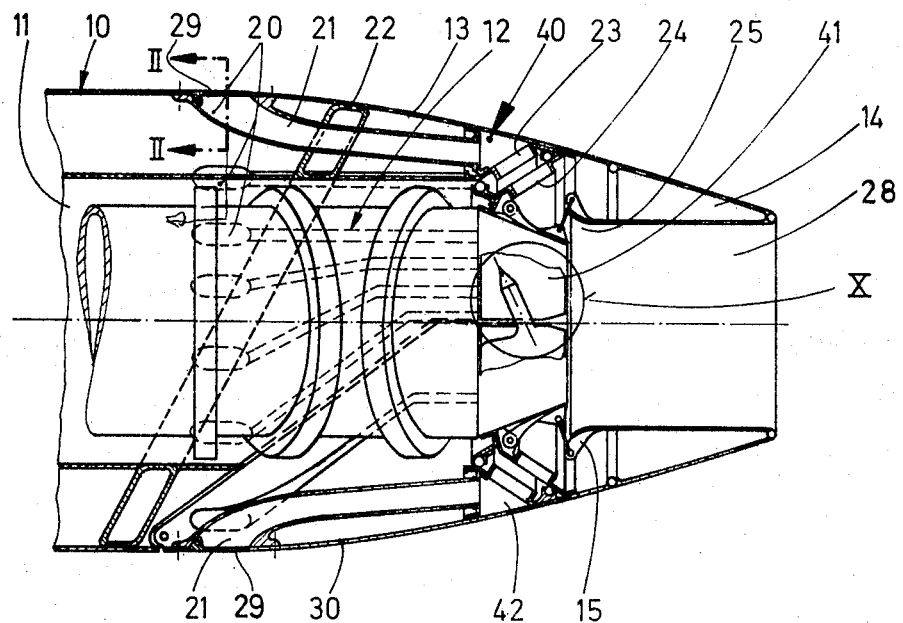
FIG. 1 is a partial cross-section view through the tail section of a jet aircraft illustrating certain features of this invention.
Figure 2:
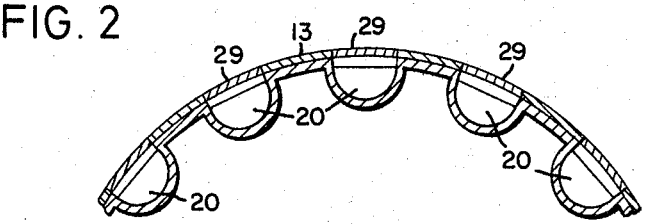
FIG. 2 is a fragmentary cross-sectional view along the line II—II of FIG. 1.
Figure 3:
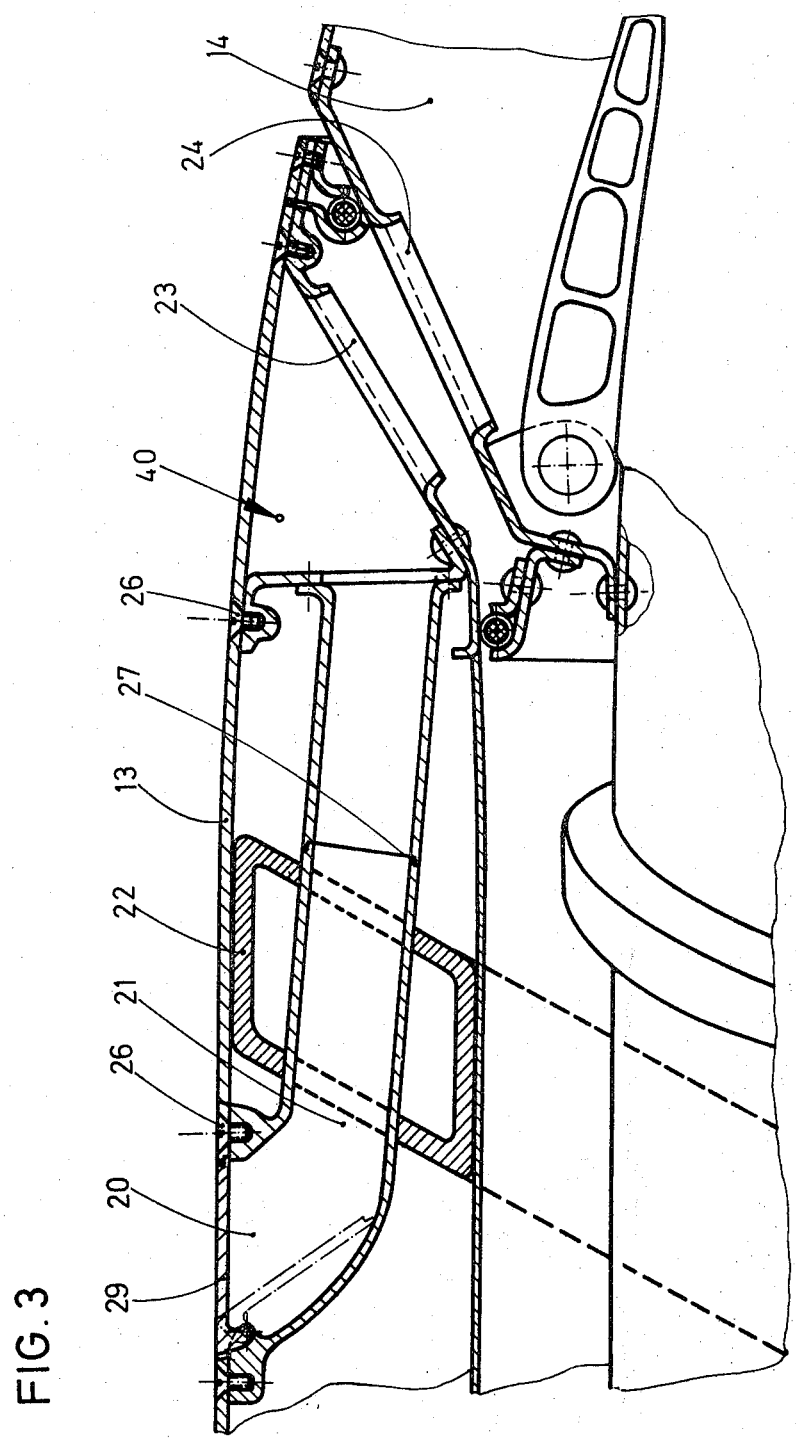
FIG. 3 is an enlarged fragmentary longitudinal sectional view of the tail section of FIG. 1.
Figure 4:
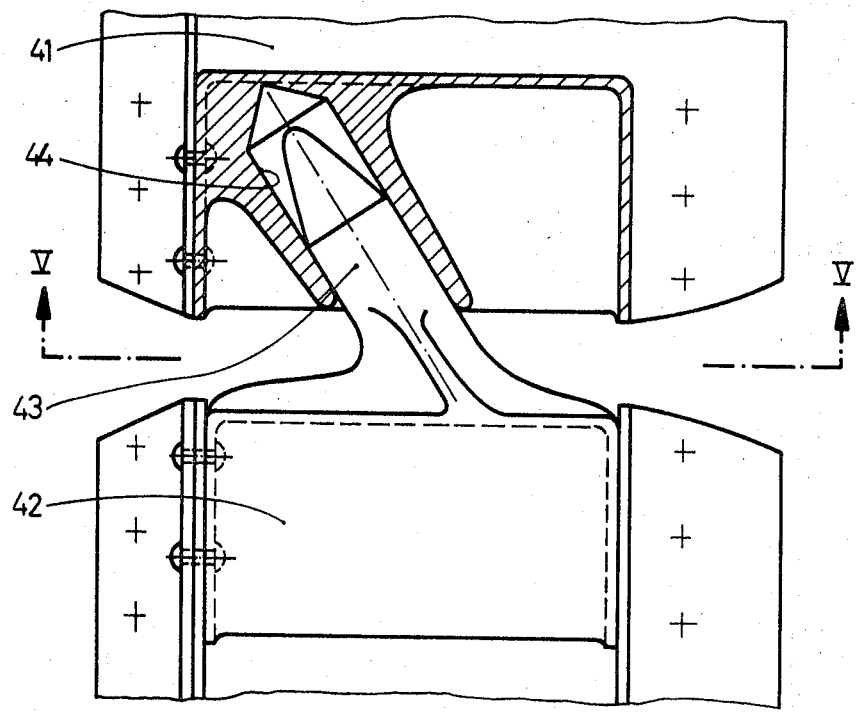
FIG. 4 is an enlarged view of detail X of FIG. 1.
Figure 5:
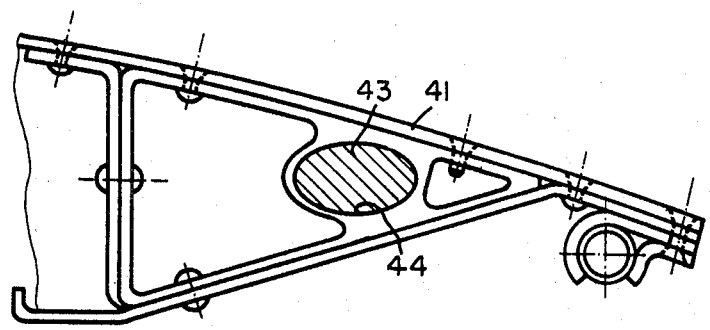
FIG. 5 is a cross-sectional view taken along the line V—V of FIG. 4.

With reference to the drawings, a tail section, 10 of a VTO/STO aircraft is illustrated which includes one or more jet engines 11. Each of the engines 11 is equipped with an exhaust deflecting nozzle 12. The tail section of the aircraft additionally includes an outer skin 13, which additionally serves as the engine cowling. The cowling defines fresh air inlet openings which are aligned with secondary air flow ducts 21. The inlet openings 20, and the ducts 21 are located about the entire periphery of the tail section 10, and correspondingly some of the inlet openings are located in the lower door of the tail section. When the door is opened, a suitable envelope is provided for deflection of the nozzle. The ducts 21 serve to conduct fresh air through the airframe 22.

As illustrated, the airframe 22 is generally trapezoidal in cross section. The air flows from the ducts 21 into a two-piece thrust ring 40. The upper half 41 of the thrust ring 40 is affixed to that portion of the engine cowl which is secured to the airframe and the lower half 42 is attached to a lower door 30 of the tail section. Secondary air flows through the openings 23 and 24 and then into the pressure-tight chamber 14, located in that section of the nozzle 28, which is secured to the engine. From the chamber 14 the air flows through a variable slot 25 located at the secondary nozzle door 15 and finally through the tail pipe of nozzle 28. In accordance with the illustrated embodiment, the individual ducts 21 are secured in place with readily removable fasteners. Serving this end ducts 21 are secured to the outer skin 13 with screws 26. The ducts are sectionalized each section of which is aligned with the adjacent section by means of centering surfaces 27. In order to obstruct the inlets 20 of the doors 29, the doors are actuated by either the pressure differential which exists between the tail section exterior and the exhaust slots of the nozzle 28 or by means of a positive control (not shown).

Serving to absorb the bending forces in the split thrust ring 40 the illustrated embodiment includes centering pins 43 which are provided in the lower thrust ring half 42. It is preferable that the centering pins 43 be associated with the tail section secured to the lower door. Each of the centering pins 43 is provided with a mating guide hole 44 in the upper half of the thrust ring 41. In this manner, the thrust ring halves, 41 and 42 are centered and locked into position. This form of alignment is particularly desirable in that it serves to absorb the bending forces which act upon the door 30.

I claim:

1. A secondary air flow discharge apparatus for directing the flow of secondary air through the tail section of a VTO/STO aircraft which includes a secondary nozzle and a door for cooperation therewith comprising an engine cowling, said engine cowling defining about the periphery thereof a plurality of air inlets, a plurality of connecting ducts, each of said connecting ducts being in communication with one of said defined inlets, and a split thrust ring forming a portion of the door apparatus of the secondary nozzle, each of said ducts terminating at said split thrust ring.

2. A secondary air flow discharge apparatus in accordance with claim 1 wherein said split thrust ring comprises two halves and alignment pins associated with one of said thrust ring halves and cooperating openings defined by said remaining thrust ring half, so as to facilitate proper alignment between the halves of the thrust ring.

3. A secondary air flow discharge apparatus in accordance with claim 2 wherein said connecting ducts compromise separate sections each displaying an alignment surface said ducts being secured to the engine cowling by detachable fasteners to facilitate assembly and disassembly.

4. A secondary air flow discharge apparatus in accordance with claim 3 wherein said ducts include on outer surface provided by the outer skin of the aircraft fuselage, and an inner skin provided by a corrugated sheet.

5. A secondary air flow discharge apparatus in accordance with claim 4 which further includes a plurality of doors positioned for obstructive relation with respect to said inlet openings and further wherein said doors are positionable by means utilizing the pressure differential developed between the exterior of the tail section and the exhaust pressure of the aircraft nozzle.

6. A secondary air flow discharge apparatus in accordance with claim 4 which further includes a plurality of doors positioned for obstructive relation with respect to said inlet openings and further wherein said doors are positionable by means openable by positive manual control.

References Cited

UNITED STATES PATENTS

| 2,540,991 | 2/1951 | Price | 244—53 |
| 2,831,321 | 4/1958 | Laucher | 239—265.37 |
| 3,163,980 | 1/1965 | Turner | 60—264 |
| 3,355,889 | 12/1967 | Taylor et al. | 244—12 |

MILTON BUCHLER, Primary Examiner

J. E. PITTENGER, Assistant Examiner

U.S. Cl. X.R.

60—264; 239—265.37